United States Patent [19]

Stackman

[11] 3,954,841

[45] May 4, 1976

[54] CURABLE RESIN COMPOSITIONS

[75] Inventor: Robert W. Stackman, Morristown, N.J.

[73] Assignee: Celanese Corporation, New York, N.Y.

[22] Filed: June 24, 1974

[21] Appl. No.: 482,293

[52] U.S. Cl. ........................ 260/475 N; 260/75 R; 526/213; 526/220; 428/431
[51] Int. Cl.² ........................................ C07C 69/83
[58] Field of Search ................................ 260/475 N

[56] References Cited

FOREIGN PATENTS OR APPLICATIONS 1,070,595  6/1967  United Kingdom.................. 260/475

*Primary Examiner*—James A. Patten

[57] ABSTRACT

Curable compositions are provided by the interaction of bis(2-hydroxyethyl) terephthalate with unsaturated epoxy derivatives such as allyl glycidyl ether to form unsaturated poly(ester-ethers).

4 Claims, No Drawings

CURABLE RESIN COMPOSITIONS

BACKGROUND OF THE INVENTION

The production of bis(hydroxyalkyl) esters of benzenedicarboxylic acids such as bis(2-hydroxyethyl) terephthalate has become of significant commercial importance in recent years because these diesters can be polymerized to form linear super polyesters. These polyesters such as polyethylene terephthalate are widely used in textiles, tire cord, and the like.

The present invention has developed from the investigation of new polymeric compositions derived from bis(2-hydroxyethyl) terephthalate which is now a inexpensive and readily available commercial product. It was deemed desirable to endeavor to introduce the excellent properties of bis(2-hydroxyethyl) terephthalate into polymeric compositions which could then be cured to high molecular weight, three-dimensional resinous structures that are substantially infusible and insoluble.

It is thus an object of the present invention to provide novel curable compositions based on bis(2-hydroxyethyl) terephthalate.

It is another object of this invention to provide methods for curing thermoplastic bis(2-hydroxyethyl) terephthalate polymers in the form of thermoset shaped articles and coatings that have resistance to all ordinary solvents and are not adversely affected by ambient conditions of heat and light.

A further object of this invention resides in the provision of block polymers of bis(2-hydroxyethyl) terephthalate polyether derivatives.

Other objects and advantages of the present invention will become apparent from the following description and examples.

DESCRIPTION OF THE INVENTION

The present invention in one of its embodiments is a process for producing novel curable compositions based on bis(2-hydroxyethyl) terephthalate. The process involves mixing together under reactive conditions bis(2-hydroxyethyl) terephthalate and an unsaturated epoxy compound having the formula:

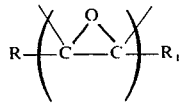

wherein R is an organic radical containing a polymerizable olefinic functional group; $R_1$ is selected from hydrogen, aliphatic, cycloaliphatic and aromatic groups; and the total number of carbon atoms in the unsaturated epoxy compound varies between four and about 22.

A preferred category of unsaturated epoxy compounds are those wherein R is selected from olefinically unsaturated aliphatic and cycloaliphatic groups containing between two and about six carbon atoms, and $R_1$ is selected from hydrogen, alkyl groups containing between one and about four carbon atoms, cycloalkyl groups containing between three and about eight carbon atoms, and aromatic groups containing between six and about 12 carbon atoms. It is understood that the epoxy group can be integrated in a bicyclo structure, such as alkenyl ether derivatives of 2,3-epoxycyclopentanol

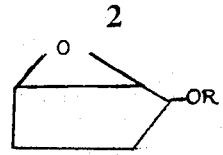

wherein R represents an alkenyl group, preferably containing from two to about four carbon atoms such as vinyl, alkyl or crotyl group.

Among the particularly preferred epoxy compounds contemplated for the practice of this invention are allyl glycidyl ether; 2,3-epoxypropyl 2-propenoate; 2,3-epoxybutyl 4-hexenoate; 1-methyl-2,3-epoxypropyl 2-decenoate; 1,2-epoxybutene-3; 1,2-epoxypentene-3; 2,3-epoxypentene-4; 1,2-epoxy-2-methylbutene-3; 1,2-epoxy-3-methylbutene-3; 3,4-epoxyhexene-5; 3,4-epoxyheptene-5; 6,7-epoxynonene-8; 6,7-epoxynonene-9; 6,7-epoxydecene-8; 1,2-epoxycyclohexene-3; 1,2-epoxycyclohexene-4; and allyl monoglycidyl ether of bisphenol A. Also contemplated are monoepoxy derivatives of polyunsaturated compounds such as limonene; vinylcyclohexene; cyclohexadiene; cyclohexenylmethyl ethers of glycols; bis(3-cyclohexenyl) ether; cyclohexenylalkyldicarboxylic acid esters; cyclohexenecarboxylates of cyclohexenylmethanols; bis(3-cyclohexenyl) carbonate; cyclopentadiene; bis(cyclopentenyl) ether; ethyleneglycol bis(3-cyclohexenecaboxylate), ethyleneglycol bis(3-cyclohexenyl) ether; divinylbenzene; dicyclopentadiene; 2-allyloxy-3-(2,3-epoxypropoxy)-1,4-dioxane; 2-(3-cyclohexenylmethoxy)-3-(3,4-epoxycyclohexylmethoxy)-1,4-dioxane, and the like.

The unsaturated epoxy compounds can be prepared by the reaction of the corresponding polyunsaturated precursors with an organic peracid. Among the peracids which are useful are peracetic acid, perpropionic acid, perbutyric acid, perhexanoic acid, perdodecanoic acid, perbenzoic acid, and monoperphthalic acid. The epoxidation reaction can be conducted in an inert organic vehicle at a temperature in the range from about 0° and 100°C. Approximately equal molar quantities of peracid and polyunsaturated precursor are reacted.

There are a variety of know methods for producing the bis(2-hydroxyethyl) terephthalate reactant of the invention process. Probably best known and most widely used methods for producing these esters of benzenedicaboxylic acids are those in which the acid is suspended in an inert liquid medium and then reacted with an alkylene oxide in the presence of a catalyst. For example, see U.S. Pat. No. 3,037,049, May 29, 1962 of Alexander A. Vaitekunas which discloses the use of such liquid reaction mediums as aromatic hydrocarbons, ketones and dioxane and which also discloses the use of tertiary amine catalysts. Also such patents as Belgian Pat. No. 666,527, Belgian Pat. No. 660,257, British Pat. No. 999,242, British Pat. No. 1,029,669, German Pat. No. 1,157,623, French Pat. Nos. 1,415,134; 1,430,842 and 1,408,874 and Netherlands Pat. Nos. 6,413,334; 6,506,220 and 6,508,415 disclose esterification processes wherein various reaction media such as hydrocarbons, halohydrocarbons, water, alcohols, nitriles and dimethylformamide-water are disclosed and wherein such catalysts as phosphines, arsines, quaternary ammonium compounds, stibines amino acids, alkali sulfites, alkali chlorides and alkali nitrates are used as catalysts. More recent advances in methods for producing bis(2-hydroxyl) terephthalate are described in U.S. Pat. Nos. 3,584,031; 3,644,484 and 3,597,471.

In preparing the curable compositions of the present invention, bis(2-hydroxyethyl) terephthalate is reacted with the unsaturated epoxy compound in a molar ratio from about two to about 50 moles of unsaturated epoxy compound per mole of bis(2-hydroxyethyl) terephthalate. The average molar ratio employed will normally vary in the range between two and about 20 moles of unsaturated epoxy compound per mole of bis(2-hydroxyethyl) terephthalate. Depending on the molar ratio employed and the chemical nature of the unsaturated epoxy compound reacted, the curable compositions of the present invention vary from water-soluble waxy materials water-insoluble resinous solids. A particularly preferred category of curable compositions are those corresponding to the structural formula:

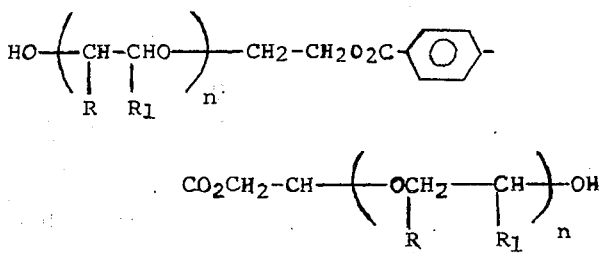

wherein $n$ is a number between 1 and about 10 condensation moieties of an unsaturated epoxy compound having the formula:

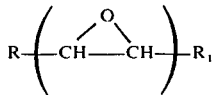

wherein R is an alkenyl group of two to about four carbon atoms, and $R_1$ is selected from hydrogen and aliphatic groups containing between one and about 18 carbon atoms.

The reaction between bis(2-hydroxyethyl) terephthalate and unsaturated epoxy compound is conducted at a temperature in the range between about 25° and 200°C. For most reactions a temperature between about 50° and 150°C. is advantageous. Inert diluents or solvents are employed as desired or necessary to enable proper handling and insure proper mixing of the reactants. Recommended inert reaction media are tetrahydrofuran, dimethylformamide, dioxane, alkyl-substituted dioxolanes such as 2-propyldioxolane, the dialkyl ethers of alkylene glycols, benzene, toluene and xylene.

The reaction between bis(2-hydroxyethyl) terephthalate and unsaturated epoxy compound is conveniently conducted at atmospheric pressure, although pressures both above and below atmospheric can be employed. It is desirable to exclude air during the reaction by providing an inert atmospheric such as nitrogen to cover the reaction mixture to prevent or inhibit any degradation of the product or deactivation of any catalyst that is present.

In order to promote the condensation reaction between bis(2-hydroxyethyl) terephthalate and unsaturated epoxy compound, it is desirable to include a catalyst in the reaction mixture. Highly effective condensation promoters are Friedel-Crafts catalysts such as halides of boron, aluminum, zinc, iron and tin; and the alkali metal alcoholates of the polyoxyalkylene glycols. These catalysts and effective in amounts of at least 0.005 percent by weight of bis(2-hydroxyethyl) terephthalate, and preferably in amounts between about 0.1 percent and 0.5 percent by weight. Friedel-Crafts catalysts such as boron trifluoride and stannic chloride and particularly effective promoters. Boron trifluoride can be employed either as a gas or as a complex with diethyl ether, dibutyl ether or monoethylamine, and the like.

The order for adding the reactants and catalyst is not critical in the process of synthesizing the curable compositions of the present invention. One reactant can be added to a mixture of the other reactant and the catalyst, or the catalyst can be added to a mixture of the two reactants. The addition may be continuous, or in successive small amounts, or in one large amount. Controlling the physical properties and molecular weight of the curable compositions can be facilitated by first mixing together bis(2-hydroxyethyl) terephthalate and the catalyst in the reaction medium, and slowly added thereto the unsaturated epoxy compound in a convenient manner.

The curable compositions of the present invention as illustrated by the hereinabove structural formula are polyfunctional in hydroxyl groups. These hydroxyl groups are the result of the condensation of bis(2-hydroxyethyl) terephthalate with the epoxy groups of the unsaturated epoxy reactant. Because of the polyhydroxy functionality characteristic of the curable compositions of the present invention, they are especially useful in coating applications because they can be used in combination with many materials which react with hydroxy groups. Particularly useful coating resins result from the reaction of the present invention curable compositions with such crosslinking agents or chain-extenders as aminoplast resins, phenoplast resins, polyisocyanates, polycarboxylic acid anhydrides, polyanhydrides, polyacids, and the like.

Typical of polyisocyanates wich can be reacted with the polyhydroxy-functional curable compositions to form chain-extended block polymers or high molecular weight crosslinked resins are n-butylene diisocyanate; hexamethylene diisocyanate; m-xylylene diisocyanate; p-xylene diisocyanate; cyclohexane-1,4-diisocyanate; p-phenylene diisocyanate, toluene 2,4,5-triisocyanate; PAPI$^{TM}$, and the polyisocyanates disclosed in German Pat. Nos. 1,022,789 and 1,027,394, and U.S. Pat. No. 3,321,549. Suitable conditions for the reaction between a curable composition of the present invention and a polyisocyanate are described in U.S. Pat. Nos. 2,620,516; 2,625,531; 2,692,873 and 2,692,874.

Typical of polyanhydrides which can react with the invention polyhydroxy-functional curable compositions are the polymers and copolymers of maleic anhydride, itaconic anhydride, and other similar polymerizable anhydrides. Tyical polycaboxylic acid anhydrides which are useful include succinic anhydride, pathalic acid anhydride, and the polycarboxylic acid anhydrides disclosed in U.S. Pat. No. 3,247,283.

Typical of polyacids which can react with the invention polyhydroxy-functional curable compositions are succinic acid, phthalic acid, phosphoric acid, and the polyacids disclosed in U.S. Pat. Nos. 3,247,283; 3,454,672; 3,655,820; 3,794,608; 3,794,624; and 3,795,640.

When a solvent is employed as a medium to react bis(2-hydroxyethyl) terephthalate and unsaturated epoxy compound to form the curable composition in accordance with the present invention, it is advantageous to retain the reaction medium and the curable reaction product together as a coating composition. This coating composition can be applied in any suitable fashion by dipping, brushing, roller coating, spraying, and the like. Any suitable substrate may be coated such as wood, paper, porous plastics, steel, aluminum, copper, and the like. If desired the coating composition may contain any suitable pigment such as iron oxide, carbon black, titanium dioxide, zinc oxide, chrome green, lithol red, and the like.

The curable compositions of the present invention, and the various block polymers and crosslinked resins derived therefrom, all contain olefinic unsaturation, and can be cured to high molecular weight infusible insoluble resinous structures. The curing of these unsaturated compositions can be accomplished by air-drying, preferably at an elevated temperature to accelerate the process. A curing agent can be incorporated into the curable composition in an amount of from about 0.1 to 5 weight percent based on the weight of the curable composition. Typical curing agents for unsaturated compositions include hydrogen peroxide, dicumylperoxide, ditertiary-butylperoxide, benzoylperoxide, and other suitable free radical-generating compounds, and metal derivatives such as cobalt naphthenate.

The following examples are further illustrative of the present invention. The reactants and other specific ingredients are presented as being typical, and various modifications can be devised in view of the foregoing disclosure within the scope of the invention.

EXAMPLE 1

Preparation of Bis(2-hydroxyethyl) Terephthalate

A 3-liter stirred autoclave is charged with 600 grams of crude terephthalic acid (3.61 moles), 1600 ml. of 2-propyldioxolane reaction medium, 0.11 mole of tetraethyl ammonium terephthalate catalyst and then purged with nitrogen. Liquid ethylene oxide (473 grams, 10.75 mole) is then pumped in and the reactor heated quickly to 155°C. by passing steam through internal coils. After about 3 ½ minutes the reaction is terminated by pressuring the contents of the autoclave into a vessel where the ethylene oxide is flashed and then the unreacted terephthalic acid removed by filtration. Cooling of the filtrate to about 18°C. yields about 742 grams of crude bis(2-hydroxyethyl) terephthalate.

EXAMPLE 2

Preparation of Catalyst For Bis(2-hydroxyethyl Terephthalate Synthesis

A catalyst is prepared from Montek 600E by mixing 24 grams of the material with 19.5 grams of terephthalic acid as well as 30 ml. of water so that good mixing can be obtained. After stirring the mixture for about 1 hour it is placed on a rotary film evaporator for the removal of the water and a thick solid recovered which is the terephthalic acid salt of the hydroxyethylated polyethyleneimine. Montrek 600E is Dow Chemical Company's designation for a 40% aqueous solution of hydroxyethylated polyethyleneimine which is prepared by reacting polyethyleneimine having a molecular weight of about 40,000 to 60,000 with ethylene oxide.

EXAMPLE 3

Preparation of Bis(2-hydroxyethyl) Terephthalate

A 3-liter stirred autoclave is charged with 600 grams (3.6 moles) of fiber grade terephthalic acid, 1600 ml. chlorobenzene, 12.4 grams of the terephthalic acid salt of hydroxyethylated polyethyleneimine as prepared in Example 2, and then purged with nitrogen. Liquid ethylene oxide (8.6 moles) is then pumped in and the reactor heated to 175°C. by passing steam through internal coils. The temperature is maintained at 175°C. for about 30 minutes with the pressure varying during the period from about 215 p.s.i.g. at the beginning of the period to 80 p.s.i.g. at the end of the period. After the thirty minute period the reaction is terminated by pressuring the contents of the autoclave into a vessel where ethylene oxide is flashed and then the unreacted terephthalic acid and other solids removed by filtration. Cooling of the filtrate to about 30°C. yields about 760 grams of bis(2-hydroxyethyl) terephthalate (dry basis). Conversion of the terephthalic acid charged to the diester product is about 91 mole percent.

EXAMPLE 4

Preparation of Unsaturated Poly(ester-ether) From Bis(2-hydroxyethyl) Terephthalate Condensed With Allyl Glycidyl Ether To a 250 ml. three-necked flask is added 25.4 grams of bis(2-hydroxyethyl) terephthalate, 100 ml. benzene and 2 ml. of $BF_3$-dibutyl etherate. The mixture is heated with stirring to 60°C. then cooled to 50°C. and 92 grams of allyl glycidyl ether is added dropwise over a 2 hour period. The exothermic reaction keeps the temperature at 50°–55°C. during the addition. After the addition is complete the mixture is heated to 70°C. and held for 2 hours. At the end of this period the reaction mixture is a pale yellow solution. The catalyst is neutralized with triethylamine and $H_2O$ and the solution is cooled. The solvent is removed to yield 120 grams of a pale yellow viscous oil.

EXAMPLE 5

Air-dried Coating From Unsaturated Poly(ester-ether)

Five grams of the product from Example 4 is mixed with 0.1 gram cobalt naphthenate solution (6% cobalt). The mixture is spread on a plate and heated to 60°C. in an air oven. After 70 minutes the film has cured to a non-tacky coating. After 17 hours the coating is cured to a hard film. Films could also be cured at room temperature but the cure time is longer.

EXAMPLE 6

Air-dried Coating From Unsaturated Poly(ester-ether)

In a manner similar to that of Example 4, 100 grams of bis(2-hydroxyethyl) terephthalate are reacted in tetrahydrofuran with 500 grams of 1,2-epoxybutene-3(butadiene monoxide).

A 0.1 weight percent quantity of benzoyl peroxide is added, and the solution is dip-coated on a steel hardware unit. Over a period of several days at room temperature, the coating cures to a smooth hard finish.

EXAMPLE 7

Air-dried Coating From A Polyisocyanate-extended Unsaturated Poly(ester-ether)

Twenty-five grams of the product from Example 4 is mixed with 3.4 grams of tolylene diisocyanate and 1 drop of triethyl amine. The mixture is allowed to stand overnight, then 5 grams of the resultant viscous liquid is mixed with 0.1 grams of a cobalt naphthenate solution and 5 grams of benzene. The resultant solution is spread on a plate and allowed to stand in the air for 5 hours. At the end of this period the film is a cured tack-free coating.

EXAMPLE 8

Air-dried Coating From A Polycarboxylic Acid Anhydride-extended Unsaturated Poly(ester-ether)

One hundred grams of the product from Example 4 is introduced into a reaction flask with 13 grams of phthalic anhydride. The mixture is gradually heated up to a temperature of about 230°C over a period of 4 hours under a nitrogen atmosphere. The product upon cooling is a clear solid which is soluble in chlorinated hydrocarbons.

A 50% solution of the product, containing 0.2% cobalt naphthenate, is cast on a glass plate, and the resulting film is air-dried at room temperature for 5 hours. At the end of this period the coating is clear, tack-free, and insoluble in chlorinated hydrocarbons.

EXAMPLE 9

Air-dried Coating From A Polyacid-extended Unsaturated Poly(ester-ether)

One hundred grams of the product from Example 4 is placed in a reaction flask equipped with a Dean-Stark trap, and a stirrer. Then 12.7 grams of adipic acid, 0.5 gram of toluenesulfonic acid, and 500 ml. of xylene are added, and the mixture is stirred at reflux for 6 hours. Approximately 3 ml. of water are collected in the Dean-Stark trap.

After the removal of the solvent under vacuum, 105 grams of a clear pale yellow solid is obtained which is soluble in trichloroethane. Using the procedure of Example 8, a film is cast on a steel plate and air-dried in 3 hours to a hard, scratch-resistant coating.

What is claimed is:

1. A curable composition consisting essentially of the reaction product of one mole of bis(2-hydroxyethyl) terephthalate and from about 2 moles to about 50 moles of an unsaturated epoxy compound having the formula:

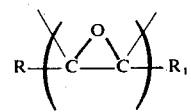

wherein R is an organic radical containing a polymerizable olefinic functional group; $R_1$ is selected from hydrogen, aliphatic, cycloaliphatic and aromatic groups; and the total number of carbon atoms in the unsaturated epoxy compound varies between four and 22.

2. A curable composition according to claim 1 wherein the unsaturated epoxy compound is 1,2-epoxybutene-3.

3. A curable composition according to claim 1 wherein the unsaturated epoxy compound is allyl glycidyl ether.

4. A curable composition corresponding to the formula:

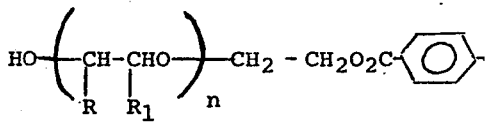

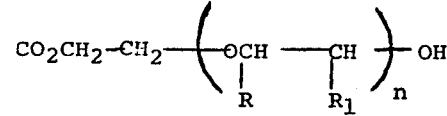

wherein $n$ is a number between one and 10 condensation moieties of an unsaturated epoxy compound haing the formula:

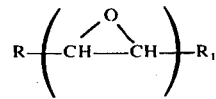

wherein R is an alkenyl group of two four carbon atoms; and $R_1$ is selected from hydrogen and aliphatic groups containing between one and 18 carbon atoms.

* * * * *